United States Patent [19]
Campbell et al.

[11] 3,956,250
[45] May 11, 1976

[54] ALPHA METHYL STYRENE AND VINYL TOLUENE AND PROCESSES OF PREPARATION

[75] Inventors: Clarence C. Campbell, Clairton; Dean A. Finfinger, Forward Township, Allegheny County, both of Pa.

[73] Assignee: Hercules Incorporated, Wilmington, Del.

[22] Filed: June 26, 1972

[21] Appl. No.: 266,386

Related U.S. Application Data

[60] Continuation-in-part of Ser. No. 135,492, April 19, 1971, which is a continuation-in-part of Ser. No. 52,139, July 2, 1970, which is a division of Ser. No. 831,540, June 9, 1969, Pat. No. 3,630,981.

[52] U.S. Cl. .......................... 526/194; 260/28.5 R; 526/347
[51] Int. Cl.² ................ C08F 210/00; C08F 212/00
[58] Field of Search .................. 260/88.2 C, 93.5 S, 260/93.59

[56] References Cited
UNITED STATES PATENTS

| | | | |
|---|---|---|---|
| 2,104,000 | 12/1937 | Reppe et al. | 260/2 |
| 3,000,868 | 9/1961 | Powers | 260/88.2 |
| 3,427,275 | 2/1969 | Davis | 260/31.8 |
| 3,630,981 | 12/1971 | Finfinger et al. | 260/28.5 |
| 3,639,369 | 1/1972 | Norton et al. | 260/88.2 |
| 3,640,981 | 2/1972 | Davis | 260/88.2 C |

OTHER PUBLICATIONS
Bly, J. Polymer Science, 1968, C-21, 13-21.
Nakajima, J. Polymer Science, 1968, C-21, 153-158.
Nakajima, J. Applied Polymer Science, 1971, 15, 3089-3099.
Nakajima, in "Polymer Molecular Weight Methods," Advances in Chemistry Series 125, Amer. Chem. Soc., pp. 98-107.
Miller, "The Structure of Polymers", 1968, pp. 330-333, (Rheinhold).

Primary Examiner—Joseph L. Schofer
Assistant Examiner—A. L. Clingman
Attorney, Agent, or Firm—Charles L. Board

[57] ABSTRACT

The specification discloses resinous compositions comprising copolymers of alpha methyl styrene and vinyl toluene, 95 percent by weight of said copolymers having molecular chain lengths less than 100 Angstroms. The compositions are characterized by softening points in the range of about 10 to 98°C and good solubility in paraffin wax. Processes are disclosed for preparing said compositions by copolymerizing mixtures of monomers of vinyl toluene and alpha methyl styrene in a weight ratio in the range of 2.5:1 to 4.5:1 in the presence of an acid clay catalyst.

3 Claims, 1 Drawing Figure

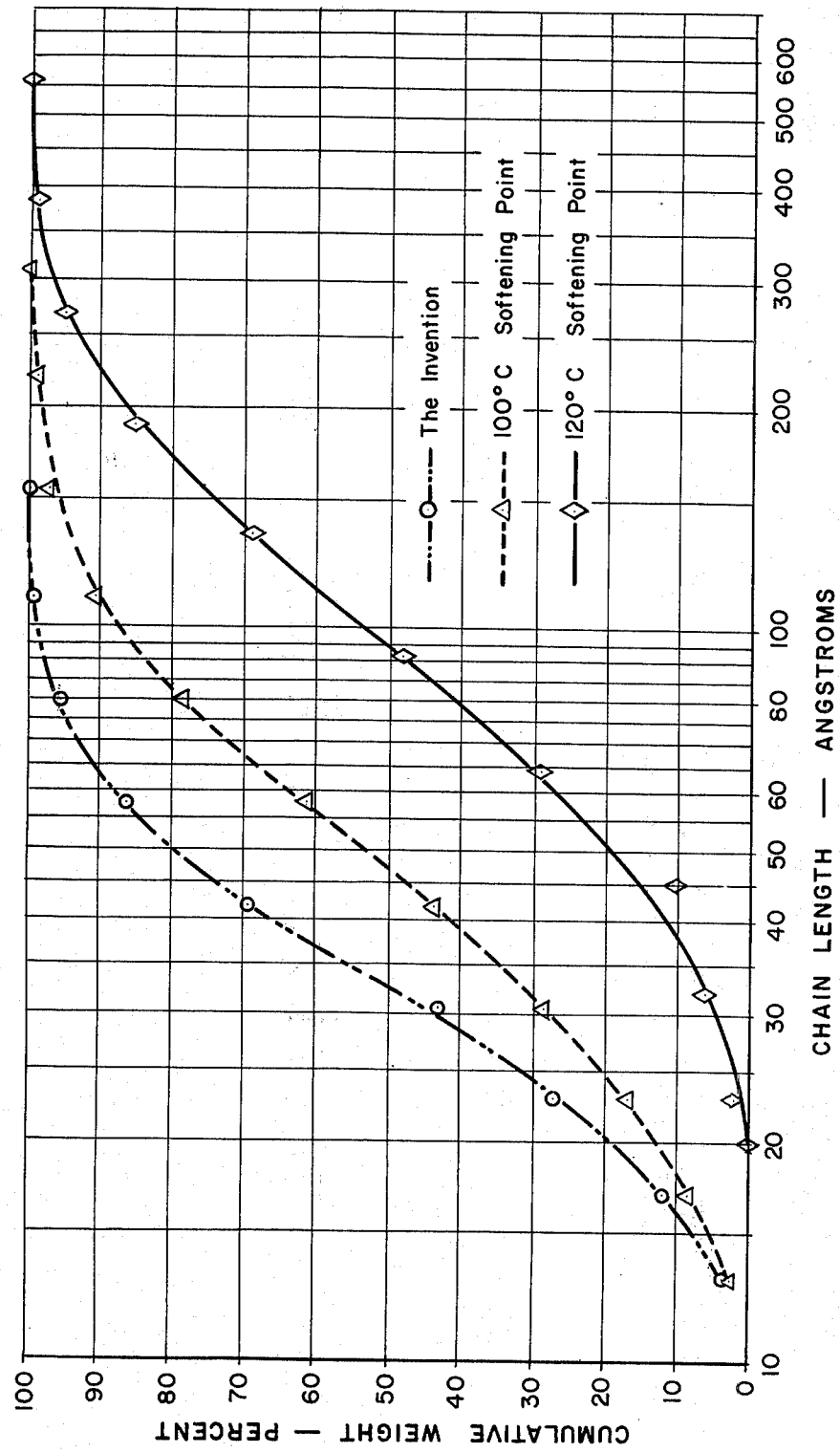

ALPHA METHYL STYRENE AND VINYL TOLUENE AND PROCESSES OF PREPARATION

This application is a continuation-in-part of our co-pending application Ser. No. 135,492, filed Apr. 19, 1971, which is a continuation-in-part of our co-pending application Ser. No. 52,139, filed July 2, 1970, which is a division of application Ser. No. 831,540, filed June 9, 1969, now U.S. Pat. No. 3,630,981, issued Dec. 28, 1971; and this application is a continuation-in-part of said application 52,139.

This invention relates to resinous copolymers of alpha methyl styrene and vinyl toluene and to processes for their preparation.

It is known that monomers of alpha methyl styrene and vinyl toluene may be copolymerized by reacting them in the presence of $BF_3$ catalyst to produce resins having softening points (Ring and Ball) of 100°C or above. For example, see Powers U.S. Pat. No. 3,000,868.

Hot melt compositions are generally intended to produce coatings having a high blocking point, good hardness and good scuff resistance. To achieve these properties, the composition will usually contain modifying resins having softening points in the range of 85°C to 150°C. Blends of this character normally will possess the necessary mar and heat resistance for coating applications. The coating viscosities obtained with these compositions are high and are normally controlled with the addition of waxes, polyethylenes or other sharp melting point materials.

The known resinous copolymers of alpha methyl styrene and vinyl toluene having softening points in the 100°C. range, while soluble in a variety of solvents, have been found to be only slightly soluble in paraffin wax. Accordingly, the use of these resins in hot melt compounds, particularly in wax blends, for coatings has been heretofore limited. Wax coating blends containing the known resins are milky white in color at low temperatures and produce a clouded surface when applied to a substrate. The undesirable solubility characteristics of these known resins in wax is especially unfortunate since in pure form the resins possess the other qualities needed in coatings for food packaging; namely, water white color, good color stability and negligible odor emission.

It has been found to be highly desirable to add resinous materials to hot melt coating blends for food packaging. Coatings produced from wax alone or, more commonly, blends of wax and ethylene copolymers exhibit good moisture vapor resistance, good water resistance and high flexural strength at low temperature; and these coatings are widely used in food packaging. However, coatings of wax or wax and ethylene copolymers alone do not possess good adhesion properties when applied to various substrates. The addition of resinous materials to the coating blend renders it adherent.

The solubility of the known alpha methyl styrene and vinyl toluene copolymer resins in wax blends does improve when the softening point of the resin is drastically lowered but conventional low softening point resins are not useful in wax coatings because they do not impart the hardness required in such coatings. However, the higher softening point resins of the invention overcome the solubility difficulties and simultaneously impart the hardness required by wax coatings.

In the case of adhesives, sealants and caulks, however, the use of wax as a viscosity modifier can reduce or eliminate the desirable properties of tack and adhesion. Thus, resin modifiers for compounds such as adhesives, sealants and caulks must be both more compatible and more soluble in these applications so that viscosity and tack (or wetting) may be effectively controlled.

We have discovered processes for producing resinous copolymers of alpha methyl styrene and vinyl toluene which exhibit unanticipated high solubility in paraffin wax, thereby making them ideal for use in wax coating blends. The wax solubility of the resins is believed to be achieved by carefully controlling the molecular chain length and molecular weight distribution of the copolymers. Further, the copolymers of alpha methyl styrene and vinyl toluene retain the desirable properties of water white color, good color stability and negligible odor emission. By reacting monomeric alpha methyl styrene and vinyl toluene in the presence of an acid clay catalyst, the processes of the invention are significantly safer and more economical than processes used heretofore.

We have discovered copolymers of alpha methyl styrene and vinyl toleune which possess the solubility and compatibility characteristics sought for use in adhesives, sealants, caulks and the like. The resins of the invention are also useful as tackifiers, wetting agents, plasticizers and/or softening agents for adhesives, caulks and sealants based on (i) all grades of ethylene vinyl acetates and other ethylene copolymers; (ii) chlorinated, natural, nitrile, polybutadiene, neoprene, polyisoprene, styrene butadiene, styrene acrylate or vinyl-toluene-butadiene elastomers; and (iii) acrylic polymers and copolymers, polyvinyl acetate, alkyds and drying oils.

We provide a resin composition comprising copolymers of alpha methyl styrene and vinyl toluene characterized by a softening point (Ring and Ball) in the range of about 10° to 98°C, 95 percent by weight of said copolymers having molecular chain lengths less than 100 Angstroms. Preferably, the composition of the invention has a weight ratio of vinyl toluene to alpha methyl sytrene in the range of 2.5:1 to 4.5:1. We prepare the copolymers by reacting the monomers in an inert diluent in the presence of acid clay as a catalyst. We preferably produce a resin having a Cloud Point solubility of less than 165°F. in a 50% solution of paraffin wax.

Other details, objects and advantages of the invention will become apparent from the following description and examples.

PREPARATION OF THE RESIN

The process for preparing alpha methyl styrene/vinyl toluene copolymers taught in U.S. Pat. No. 3,000,868 employs $BF_3$ as the polymerization catalyst. In order to obtain softening points of about 75°C with that process, it is necessary to carry out the reaction at temperatures in the range of 95° to 100°C and to reach softening points below 75°C, the reaction temperatures must be correspondingly higher. For example, softening points of about 40°C require a reaction temperature of about 137°C which is the temperature at which the reaction solvent and the monomers begin to boil. Thus, the preparation of resins having softening points of about 40°C and lower requires pressure equipment and seals.

High reaction temperatures tend to reduce the degree of control which can be exercised over the reaction because of the large temperature differential (sometimes 100°–115°C or more) between the reactants and the cooling medium. Use of a warmer cooling medium may lengthen the reaction time and diminish product yields. High reaction temperatures also generate vapors which are noxious and toxic. Also by reason of static charges produced by the flowing resin solution, they present an additional safety hazard. High temperatures also tend to have an adverse effect upon the color of the product due to side reactions.

By way of example, the $BF_3$ catalyzed process requires that the concentration of monomers be at least about 75% in order to get economically feasible yields of a 75°C softening point copolymer, say about 90%. As the reaction temperatures are increased to achieve softening points below 75°C, monomer concentration must be correspondingly increased in order to maintain yields of about 90%. High monomer concentrations produce an extremely viscous product which must be diluted during cooling before product recovery procedures can begin (e.g. filtration, still charging etc.).

The processes of the present invention overcome the foregoing problems. Use of an activated acid clay catalyst permits lower polymerization temperatures while maintaining yields at acceptable levels. For example, the temperature necessary to produce a 25°C softening point resin is only about 80°C, a temperature well within the normal control range and well below the lowest reaction temperature required in a $BF_3$ reaction to produce resins at the upper end of the range of softening points here involved.

We also believe that the acid clay catalyst may tend to absorb color bodies which caused resin discoloration in the $BF_3$ process. Our process also enables us to obtain lower OMS (odorless mineral spirits) Cloud Points then obtained with the $BF_3$ process.

The resinous compositions of the present invention are produced by reacting monomers of alpha methyl styrene and vinyl toluene in the presence of an acid clay catalyst. Although the proportions of the starting materials may be varied, we prefer to maintain the ratio of vinyl toluene to alpha methyl styrene charged to the reactor in the range of about 2.5:1 to 4.5:1 on a weight basis. The amount of catalyst is preferably in the range of about 2% to 3.3% by weight based on the total charge but this may be varied without adverse effect.

The following examples are illustrative of procedures which may be followed in the practice of the invention, although variations in sequence, times, and temperatures may be introduced without departing from the invention.

EXAMPLE 1

A 500 cc conventional three-necked flask equipped with an agitator, a thermometer and a gas inlet for providing a nitrogen blanket is charged with 67 grams of an inert diluent (in this case, Solvesso 100, the trademark of a product supplied by Humble Oil Corporation). The system is purged with nitrogen and a nitrogen blanket is maintained during the reaction period. 3.3 grams of an acid clay catalyst (in this case, Filtrol Grade 22 acid clay, the trademark of a product supplied by Filtrol Corporation) is added to the flask and suspended in the diluent by stirring.

The temperature of the mixture is adjusted to 16°C. and a mixture of monomers consisting of 75 grams of vinyl toluene and 25 grams of alpha methyl styrene is added to the flask over a period of 35 minutes. During the addition period, the temperature of the reaction mixture is maintained at 16°C. plus or minus 2°C. with an alcohol-dry ice bath.

After the monomer addition is completed, the batch is held at reaction temperature for 30 minutes and is then raised to 50°C. and held at this temperature for about 30 minutes to assure completion of the reaction. The contents of the flask are heated to 60°C. and filtered through filter paper using a Buchner funnel to which a vacuum is applied. Filtration may be facilitated by applying a pre-coat of filter aid to the funnel.

The filtrate is distilled to remove the solvent and any low polymers or heavy oils which may be present. 97 to 98 grams of resinous material are recovered.

The resin exhibits the following properties:
Color (Gardner scale) —water white
Softening Point (Ring and Ball) —90°–98°C.
Cryoscopic Molecular Weight —800
Gravity at 25°C. —1.04
Refractive Index —1.585
Bromine No. —0.3–0.6

Molecular size distribution studies conducted according to the well known Gel Permeation Chromatography technique indicate that the maximum chain length of the copolymer molecules of the new resin is markedly lower than maximum chain lengths of the known alpha methyl styrene/vinyl toluene copolymer molecules. For instance, the maximum chain length of molecules present in 98 weight percent of a sample of the resin of the present invention was about 90 Angstroms (A). Similar weight percent samples of alpha methyl styrene/vinyl toluene copolymers, produced by previously known techniques and having softening points of about 75°C., 100°C. and 120°C. exhibited maximum chain lengths exceeding that of the invention; namely, 110A, 200A and 320A, respectively. Those data clearly indicate that the molecules of the new resin have maximum chain lengths of approximately one half those of known alpha methyl styrene/vinyl toluene copolymers having similar hardness characteristics.

The Gel Permeation Chromatography studies were also revealing as to the molecular size distribution of the resin of the present invention compared with the known alpha methyl sytrene/vinyl toluene copolymers. The accompanying FIGURE is a plot of molecular chain length against cumulative weight percent for the invention and for two samples of the prior art copolymers, one having a similar softening point and the other a higher softening point.

From the FIGURE, it can be observed that the range of chain lengths for molecules of the invention in that portion of the sample between 5 and 95 cumulative weight percent varies from about 13 to 76A. Similar portions of the samples having softening points of 100°C. and 120°C. exhibit chain lengths varying from about 14 to 145A and from about 30 to 270A respectively.

EXAMPLE 2

786 gallons of vinyl toluene and 253 gallons of alpha methyl styrene are preblended (at ambient temperature) and added at 7 gallons per minute to a reactor containing a pre-heated suspension of catalyst in an inert diluent consisting of 719 gallons of Solvesso 100 (a petroleum solvent having the composition (volume %): 98.9% aromatics and 1.1% paraffins supplied by Humble Oil Corporation) and 275 lbs. of an acid clay catalyst (such as Filtrol Grade 22 acid clay supplied by Filtrol Corporation). A nitrogen blanket is maintained over the reactor throughout the reaction. The temperature of the catalyst suspension is controlled at 45°C. during monomer addition by circulating the reaction mixture to an external, brine-cooled heat exchanger and back to the reactor. After the addition of monomers is completed, the bath is held at reaction temperature for 30 minutes. The resinous product is recovered by filtration and steam distilling of the reaction mixture at 220° to 230°C. using procedures and equipment well known in the art. The product exhibited the following properties:

| | |
|---|---|
| OMS Cloud Point | −30°C |
| Saybolt Color | +28 |
| Gardner Color | Water White (WW) |
| Softening Point (Ring and Ball) | 76°C |
| Yield | 96.1% | ture of the reaction is preferably maintained within ±1°C.

For further examples of the invention, reference may be had to Tables I and II below. There, the data obtained from numerous runs made under varying conditions and with varying amounts and types of materials are all presented in tabular form. The equipment and general procedures (except where noted) described above in Examples 1 and 2 were observed in carrying out these runs. In all cases, the inert diluent used was Solvesso 100 and the catalyst was Filtrol Grade 22 acid clay.

The product yields of the runs reported in Table I all ranged above 90 percent and the resins produced all exhibited water white color as measured on the Gardner Scale. From the Table, it can be seen that the proportions of starting materials, the reaction temperature, the addition procedure and the addition time may be varied with no adverse effect upon the properties of the final product.

TABLE I

| Run No. | Vinyl Toluene to Alpha Methyl Styrene Ratio (by weight) | % Monomers in Solution | Type of Addition* | % Clay to Monomers | Reaction Temp. °C | Clay or Monomer Addition Time (min.) | Holding Time (min.) After Reaction | Softening Pt. °C |
|---|---|---|---|---|---|---|---|---|
| 1 | 3:1 | 50 | direct | 1.0 | 43–45 | 15 | 30 | 89 |
| 2 | 3:1 | 50 | reverse | 1.5 | 20–25 | 35 | 30 | 93 |
| 3 | 3:1 | 50 | reverse | 1.5 | 15–20 | 35 | 30 | 98 |
| 4 | 3:1 | 40 | reverse | 1.87 | 15–20 | 40 | 40 | 93.5 |
| 5 | 3:1 | 60 | reverse | 1.25 | 15–20 | 40 | 40 | 95 |
| 6 | 3:1 | 50 | reverse | 1.5 | 10–13 | 30 | 40 | 94 |
| 7 | 3:1 | 50 | reverse | 2.0 | 5–8 | 30 | 40 | 97.5 |
| 8 | 4:1 | 60 | reverse | 1.67 | 10–12 | 32 | 40 | 93.5 |
| 9 | 4:1 | 60 | reverse | 2.5 | 10–12 | 32 | 40 | 94 |
| 10 | 4:1 | 60 | reverse | 3.83 | 10–12 | 32 | 30 | 94 |

*Reverse addition is where a mixture of monomers is added to a suspension of catalyst in diluent.

TABLE II

| Run No. | Vinyl Toluene to Alpha Methyl Styrene Ratio (by weight) | % Monomers in Solution | Type of Addition* | % Clay (To Total Batch) | Reaction Temp. °C |
|---|---|---|---|---|---|
| 1 | 3.0:1 | 55 | Reverse | 2.0 | 40 |
| 2 | 3.0:1 | 55 | Reverse | 2.0 | 39 |
| 3 | 3.1:1 | 60 | Reverse | 2.0 | 43 |
| 4 | 3.0:1 | 55 | Reverse | 2.0 | 48–50 |
| 5 | 3.5:1 | 65 | Reverse | 2.0 | 44–46 |
| 6 | 3.0:1 | 70 | Reverse | 2.0 | 60 |
| 7 | 3.0:1 | 70 | Reverse | 2.0 | 65 |
| 8 | 3.0:1 | 70 | Reverse | 2.0 | 70 |
| 9 | 3.0:1 | 70 | Reverse | 2.0 | 80 |

| Addition Time (Min.) | Holding Time (Min.) | Holding Temp. °C | Softening Pt. °C | OMS Cloud Point °C | Saybolt Color | Gardner Color | Yield (%) |
|---|---|---|---|---|---|---|---|
| 142 | 30 | 40 | 76 | <−30 | +28 | — | 94.1 |
| 115 | 30 | 39 | 78 | <−30 | +28 | — | 94.3 |
| 120 | 30 | 43 | 79 | −30 | +28 | — | 96.1 |
| 110 | 30 | 50 | 39 | <−35 | — | WW | 92.3 |
| 75 | 30 | 45 | 48.5 | <−35 | — | WW | 99.3 |
| 70 | 90 | 60 | 66 | — | — | WW | 94.8 |
| 48 | 90 | 65 | 56 | — | — | WW | 89.3 |
| 73 | 90 | 70 | 40.5 | — | — | WW | 88.0 |
| 75 | 90 | 80 | 25.5 | — | — | WW | 91.0 |

*Reverse addition is where a mixture of monomers is added to a suspension of catalyst in diluent Although other proportions of the monomers may be used in the process, we prefer to maintain the ratio of vinyl toluene to alpha methyl styrene charged to the reactor in the range of about 2.5:1 to 4.5:1 on a weight basis. The amount of catalyst is preferably about 2.0% by weight based on the total batch, but this may be varied to a degree without adverse effect. The tempera-

EXAMPLE 3

An additional example of the invention is given following the general procedures and conditions of Table II as follows:

| | |
|---|---|
| Vinyl toluene/alpha-methylstyrene | 3.0/1 |
| % Monomers in solution | 70 |
| Reverse addition | |

-continued

| | |
|---|---|
| % Clay | 2.0% |
| Reaction Temperature | 90°C |
| Addition Time | 75 min. (or slightly longer) |
| Holding Time | 90 min. |
| Holding Temperature | 90°C |
| Softening Point | 10°C |

WAX SOLUBILITY

Solubility tests were undertaken to determine the adaptability of the resin of the present invention for use in wax coating blends. Two separate samples of copolymers of alpha methyl styrene and vinyl toluene were prepared in accordance with the process of the invention on a pilot plant scale as follows.

Resin A

The equipment utilized to prepare the resin was a 50 gallon, glass-lined vessel provided with an agitator. The initial charge consisted of 96 lbs. of Solvesso 100 and 5 lbs. of Filtrol Grade 22 acid clay. The agitator was operated at 180 R.P.M. and a nitrogen blanket was maintained in the vessel. 115 lbs. of vinyl toluene and 29 lbs. of alpha methyl styrene were added to the contents of the vessel over a period of about 75 minutes. During the addition period, the temperature of the reaction mixture was maintained at 13°C. plus or minus 2°C. At the end of the addition period, the temperature of the contents of the vessel was raised to 50°C. and held there for about 1 hour. The temperature was further raised to 60°C. in preparation for recovery of the product. 2 lbs. of filter aid and 2 lbs. of Attapulgus clay were added to the vessel and the contents filtered. The filtrate was distilled and the resinous product recovered exhibited the following properties:

| | |
|---|---|
| Yield | 96.7% |
| Softening Point | 94.5°C. |
| Color (Gardner) | Water White |
| OMS Cloud Point | −4°C. |

Resin B

This resin was prepared in accordance with the same procedures utilized for the preparation of Resin A except that the agitator was operated at 190 R.P.M. and the addition time was 90 minutes. The resulting product exhibited similar properties to those of Resin A.

The solubility of the samples (hereinafter designated "A" and "B") was determined in (1) a paraffin wax alone; (2) a mixrocrystalline wax alone; (3) blends of ethylene vinyl acetate (EVA) and paraffin wax wherein the concentration of vinyl acetate in the EVA was varied; and (4) blends of EVA and paraffin wax wherein the proportions of the three ingredients were widely varied. The results of those tests are presented below in Tables III-VI.

The solubility of the new resin was, in all cases, measured by the Cloud Point Test, a technique well-known to persons skilled in the art. By that method, the solvents and solute (here the resin) are heated together until a clear solution is obtained. The temperature is then decreased until cloud formation is observed. The temperature in °F is noted and that value is the measure of solubility. The lower the temperature, the higher the degree of solubility of the solute in the solvents.

Table III shows the solubility of the resin of the present invention in paraffin wax having a melting point of 155°F. Solubility determinations were made in solutions of wax and the new resin having the wax concentrations indicated.

TABLE III

| Resin | 30% WAX | 50% WAX | 70% WAX |
|---|---|---|---|
| A | 163° F. | 153° F. | 154° F. |
| B | 158° F. | 164° F. | 168° F. |

Table IV presents the indications of solubility of the new resin tested in a 50 percent solution of microcrystalline wax having a melting point of 180°F.

TABLE IV

| Resin | 59% Microcrystalline Wax |
|---|---|
| A | 244°F. |
| B | 241°F. |

Table V shows the solubility of the new resin in blends comprising 60 percent peraffin wax, 20 percent EVA and 20 percent resin. The concentration of vinyl acetate in the EVA copolymer was varied as indicated.

TABLE V

| Resin | 18% Vinyl Acetate | 25% Vinyl Acetate | 28% Vinyl Acetate | 33% Vinyl Acetate |
|---|---|---|---|---|
| A | 176°F | 160°F | 167°F | 160°F |
| B | 184°F | 166°F | 158°F | 158°F |

Finally, blends of paraffin wax, EVA and the new resin were prepared and the cloud point temperatures observed. The results of these tests are shown in Table VI. Blends 1–8 were prepared with varying proportions of the three components as indicated to simulate the broad range over which wax coatings may be formulated. The EVA used in these tests had 28% vinyl acetate in the copolymer; the most widely used variety in paraffin wax coatings. The paraffin wax component had a melting point of 155°F.

TABLE VI*

| Blend No. | 1 | 2 | 3 | 4 | 5 | 6 | 7 | 8 |
|---|---|---|---|---|---|---|---|---|
| EVA | 15 | 20 | 25 | 20 | 20 | 20 | 20 | 20 |
| Wax | 70 | 60 | 50 | 70 | 60 | 50 | 40 | 30 |
| Resin | 15 | 20 | 25 | 10 | 20 | 30 | 40 | 50 |
| Resin | | | | | | | | |
| A | 156°F | 158°F | 158°F | 153°F | 158°F | 162°F | 166°F | 170°F |
| B | 154°F | 158°F | 160°F | 158°F | 158°F | 158°F | 168°F | 186°F |

*Proportions in parts by weight.

In all of the foregoing solubility tests, the Cloud Point temperatures achieved with the new resin are significantly lower than those obtainable with previously known alpha methyl styrene/vinyl toluene copolymers having similar softening points.

Referring specifically to Table VI, Blend No. 2 represents the most common paraffin wax coating composition. The solubility of the resin of the present invention exhibited a dramatic increase in solubility of the resin of the prior art. In view of the 155°F melting point of the wax, the results for Blend No. 2 indicate a condition tantamount to solution in the solid state.

HOT MELT COATINGS

Reference is made above to the advantageous use of the composition of the present invention in hot melt compounds. Hot melt compounds are 100 percent solid materials which become sufficiently fluid at elevated temperatures to permit application to various substrates. Blends can be formulated to give various properties as required by the end use of the product. Hot melt compounds are particularly useful in protective coatings, decorative coatings, laminants, adhesives and sealants.

Most hot melt compounds are composed of one or more of the following:

1. elastomers such as ethylene copolymers, polyethylene and butyl rubber;
2. tackifiers and sealing promoters usually consisting of a resinous material;
3. surface hardeners and gloss promoters usually consisting of a resinous material;
4. plasticizers or viscosity depressants such as wax, organic plasticizers and resinous materials;
5. fillers, pigments or extenders such as carbon black, metallic powders and the like; and
6. antioxidants or heat stabilizers, the best example of which is butylated hydroxytoluene (hereinafter "BHT").

Hot melt blends formulated with wax, ethylene copolymers and the resin of the present invention may be advantageously used for corrugated coatings, folding carton coatings and food packaging. The blends may be prepared in heated, sigma-blade, higher shear mixers or in any heated, agitated tank that has sufficient heating jacket or heating coil capacity to bring the blend to the solubility temperature. In the sigma-blade, high shear type of equipment, the compounds can best be prepared by thoroughly masticating the resin and ethylene copolymers at high shear conditions and diluting and thinning the resultant product by wax addition as the final component. In agitated tank type blenders, the wax should first be heated to approximately 70°–100°F above its melting point and the ethylene copolymers added slowly to the hot wax. After all of the ethylene copolymer has dissolved in the hot wax, the resin should be slowly added.

Several hot melt compounds were formulated using the resin of the present invention. The formulations appear below and are designated "C", "D", "E", "F" and "G". Coating formulations "C" and "D" were applied to substrates by methods well known in the art and the properties of the resultant coatings measured by standard techniques. Those test data appear in Table VII below.

Formulation C — Hot Tack/Heat Seal Coating

| | Parts (by weight) |
|---|---|
| Resin of the invention | 25 |
| EVA (28% vinyl acetate) | 30 |
| Paraffin wax (155°F M.P.) | 45 |
| BHT (antioxidant) | 0.1 |

Formulation D — Corrugated Coating

| | Parts |
|---|---|
| Resin of the invention | 15 |
| EVA (28% vinyl acetate) | 15 |
| Paraffin wax (155°F M.P.) | 60 |
| Microcrystalline wax (180°F M.P.) | 10 |
| BHT (antioxidant) | 0.1 |

Formulation E — Heat Seal Coating for Folding Cartons

| | Parts |
|---|---|
| Resin of the invention | 15 |
| EVA (6 Melt Index - 28% vinyl acetate) | 12.5 |
| EVA (150 Melt Index - 28% vinyl acetate) | 12.5 |
| Paraffin wax (155°F M.P.) | 50.0 |
| Microcrystalline wax (180°F M.P.) | 10.0 |
| BHT (antioxidant) | 0.1 |
| Erucamide (slip agent) | 0.2 |

Formulation F — Extrusion Hot Melt Coating

| | Parts |
|---|---|
| Resin of the invention | 10 |
| EVA (Low Melt Index - 28% vinyl acetate) | 35 |
| Paraffin wax (155°F M.P.) | 55 |
| BHT (antioxidant) | 0.1 |

Formulation G — Hot Melt Case Sealing Adhesive

| | Parts |
|---|---|
| Resin of the invention | 35 |
| EVA (Low Melt Index - Low Vinyl acetate) | 25 |
| Polyethylene (240°F M.P.) | 15 |
| Microcrystalline wax (180°F M.P.) | 25 |
| BHT (Antioxidant) | 0.2 |

TABLE VII

Standard Test Results

| Properties | Formulation C | Formulation D |
|---|---|---|
| Cloud Point | 158°F | 156°F |
| Viscosity at: | | |
| 250°F | 12,000 cps | 500 cps |
| 275°F | 8,000 cps | 400 cps |
| 300°F | 5,500 cps | 300 cps |
| Heat Stability - Color* | | |
| Initial | | 1 |
| 7 hrs at 275°F | | 1– |
| 15 hrs at 275°F | | 1– |
| 22 hrs at 275°F | | 1+ |
| 22 hrs at 275°F +2 hrs | 300°F | 2– |
| Film Data | 3/4 mil on Glassine | 3/4 mil on M.G. Kraft Paper |
| **GFMVTR | | |
| Flat | 0.5 | 0.3 |
| Creased | 0.6 | 0.3 |
| Gradient Bar Data (coating to coating) | | |
| Block Point °F | 135 | 140 |
| Migration Point °F | 145 | 140 |
| Heat Seal Start °F | 140 | 145 |
| Heat Seal Loss | | |

TABLE VII-continued

| Properties | Standard Test Results C | Formulation D |
|---|---|---|
| °F | 230 | 215 |
| Heat Seal Range - Coating Temperature (1.0 ox. spring) | | 140° to 170°F |

*Gardner colors taken continuously
**Grams/100 sq. in/24 hrs. at 100°F and 90% R.H.

Coating blends of paraffin wax, EVA and the alpha methyl styrene/vinyl toluene copolymers of the present invention impart excellent adhesion to the substrate without requiring a porous surface for releasing solvent or water. They may be smoothly and easily applied to various substrates including fiberboard, corrugated board, and flexible packaging materials such as papers, foils and films.

The use of these coatings eliminates fire hazards and toxicity problems ordinarily associated with coatings utilizing solvents. In many cases, greater economy is achieved since no large drying ovens or heaters are necessary.

COMPATIBILITY WITH OTHER MATERIALS

The resins of the invention have been found to be particularly useful as an additive for elastomeric materials, particularly in pressure sensitive adhesive formulations. The term "elastomers" as used herein means materials which possess elastic properties including stretchability, high tensile strength and high modulus when fully stretched, high rate of retraction, and resilience. Among the specific compounds included within the term are chlorinated rubber, chlorobutyl rubber, EPDM, ethylene/vinyl acetates, isobutyleneisoprene, natural rubber, nitrile rubber, polybutadiene, polychloroprene, polyisobutylene, polyisoprene, styrene-butadiene (high butadiene), styrene-butadiene (high styrene), styrene-butadiene (block copolymer), styrene-isoprene (block copolymer); styrene-acrylate and vinyltoluene-butadiene.

To illustrate the compatibility of the resins with elastomeric materials, blends of the resin and Kraton Rubbers 1101 and 1107 (styrene-butadiene and styrene-isoprene block copolymers, respectively, obtained from Shell Oil Company) were prepared and their properties observed. These observations are tabulated in TABLE VIII.

TABLE VIII

| 25 parts resin | 25°C. S.P. Kraton 1101 | Kraton 1107 | 40°C. S.P. Kraton 1101 | Kraton 1107 |
|---|---|---|---|---|
| Compatibility | 0 | TRL | 0 | TRL |
| Product Type | HR | SR | HR | SR |
| Surface | Slight T | Slight T | D | T |
| Viscosity (molten) | Very High | High | Very High | High |
| Odor | Low | Low | Low | Low |
| Color | B | B | Clear | Clear |
| Use | C-A-L | A-L | C-A-L | A-L |
| Adhesion to Aluminum | | EX | | EX |
| 50 parts resin | | | | |
| Compatibility | TRL | TRL | TRL | TRL |
| Product Type | R | SR | HR | SR |
| Surface | T | T | D | Very T |
| Viscosity (molten) | Med. to High | Med. to High | High | Med. to High |
| Odor | Low | Low | Low | Low |
| Color | B | Clear | B | Clear |
| Use | A-L | A-L | C-A-L | A-L |
| Adhesion to Aluminum | EX | EX | EX | EX |
| 75 parts resin | | | | |
| Compatibility | TRP | TRP | TRL | TRP |
| Product Type | SR | SR | R | SR |
| Surface | Very T | Very T | SL T | Very T |
| Viscosity (molten) | Low | Low | Med. | Low |
| Odor | Low | Low | Low | Low |
| Color | B | Clear | B | Clear |
| Use | A-L | A-L | C-A-L | A-L |
| Adhesion to Aluminum | EX | EX | EX | EX |

| 25 parts resin | 56°C. S.P. Kraton 1101 | Kraton 1107 | 66°C. S.P. Kraton 1101 | Kraton 1107 |
|---|---|---|---|---|
| Compatibility | 0 | TRL | 0 | TRL |
| Product Type | HR | SR | HR | SR |
| Surface | D | SL T | D | SL T |
| Viscosity (molten) | Very High | High | Very High | High |
| Odor | Low | Low | L | Low |
| Color | B | Clear | B | Clear |
| Use | C-A-L | A-L | C-A-L | A-L |
| Adhesion to Aluminum | | EX | | EX |
| 50 parts resin | | | | |
| Compatibility | TRL | TRL | TRL | TRL |
| Product Type | R | SR | R | SR |
| Surface | SL T | T | SL T | T |
| Viscosity (molten) | Med. to High | Med. to High | Med. to High | Med. to High |
| Odor | Low | Low | Low | Low |
| Color | B | Clear | B | Clear |
| Use | A-L | A-L | A-L | A-L |
| Adhesion to Aluminum | EX | EX | EX | EX |
| 75 parts resin | | | | |
| Compatibility | TRL | TRL | TRL | TRL |
| Product Type | R | SR | R | SR |

TABLE VIII-continued

| 75 parts resin | 56°C. S.P. | | 66°C. S.P. | |
| --- | --- | --- | --- | --- |
| | Kraton 1101 | Kraton 1107 | Kraton 1101 | Kraton 1107 |
| Surface | T | Very T | SL T | T |
| Viscosity (molten) | Low to Med. | Low | Low to Med. | Low |
| Odor | Low | Low | Low | Low |
| Color | B | Clear | B | Clear |
| Use | A-L | A-L | A-L | A-L |
| Adhesion to Aluminum | EX | EX | EX | EX |

LEGEND
A — Adhesive
B — Brownish
C — Coatings
D — Dry
EX — Excellent
H — Hard
L — Laminates
O — Opaque
R — Rubbery
S — Soft
TRL — Translucent
TRP — Transparent
T — Tacky Compatibility of the resins of the invention with film formers has been observed. Included in those film formers are ethylene/vinyl acetate, ethyl cellulose N type, reactive phenolic, silicone, urethane oil, melamine formaldehyde, DCO epoxy ester, medium soya/linseed alkyd, long oil soya alkyd, styrenated alkyd, vinyltoluene alkyd, and acrylic alkyd.

The resins of the invention are also compatible over the entire range of proportions with a variety of plasticizers and drying oils including z-6 bodied linseed, Q bodied linseed, alkali refined soya, X-Y bodied soya, Z-4 dehydrated caster oil, blown soya oil, chlorinated paraffin, chlorinated biphenyl, polyesters, dioctyl phthalate, mineral oil, polybutene, and tricresyl phosphate.

In addition, the resins of the invention are believed to have application as extenders or modifiers for epoxy compounds used in potting compounds, adhesives or coatings; and as modifiers for paints, varnishes or lacquers based on ethylene vinyl acetates, polyvinyl acetates, acrylics, nitrocellulose, ethyl cellulose, epoxies, alkyds, drying oils, chlorinated rubber, styrene butadiene, styrene acrylates or vinyltoluene butadiene.

We claim:

1. A process for preparing copolymers of alpha methyl styrene and vinyl toluene having softening points in the range of 25°C. to 98°C. which comprises subjecting a mixture of monomers consisting essentially of 2.5 to 4.5 parts by weight of vinyl toluene and 1 part by weight of alpha methyl styrene in an inert diluent to the catalytic action of acid clay, maintaining the temperature of the reaction mixture in the range of 5° to 80°C., and recovering the product of the reaction.

2. A process as recited in claim 1 for preparing copolymers of alpha methyl styrene and vinyl toluene having low cloud points wherein the temperature of the reaction mixture is maintained in the range of 5°C. to 18°C.

3. A process for preparing copolymers of alpha methyl styrene and vinyl toluene having softening points under about 98°C. which comprises subjecting a mixture of monomers consisting essentially of 2.5 to 4.5 parts by weight of vinyl toluene and 1 part by weight of alpha methyl styrene in an inert diluent to the catalytic action of acid clay, heating the mixture to a temperature above the reaction temperature, controlling the temperature of the reaction mixture in the range of 5°C. to 80°C., and thereafter recovering the reaction product.

* * * * *